July 30, 1963 E. J. WILLIAMS 3,099,822

MAGNETIC DATA STORAGE DEVICES

Filed Sept. 22, 1959 2 Sheets-Sheet 1

INVENTOR
EMRYS JOHN WILLIAMS

BY Hane and Nydick

ATTORNEYS

July 30, 1963 E. J. WILLIAMS 3,099,822

MAGNETIC DATA STORAGE DEVICES

Filed Sept. 22, 1959 2 Sheets-Sheet 2

INVENTOR
EMRYS JOHN WILLIAMS

BY Kane and Kydick

ATTORNEYS

United States Patent Office 3,099,822

Patented July 30, 1963

3,099,822

MAGNETIC DATA STORAGE DEVICES

Emrys John Williams, Stevenage, England, assignor to International Computers and Tabulators Limited., (formerly The British Tabulating Machine Company Limited).

Filed Sept. 22, 1959, Ser. No. 841,496
Claims priority, application Great Britain Oct. 10, 1958
4 Claims. (Cl. 340—174.1)

The present invention relates to methods of producing magnetic storage devices, such for example, as magnetic drum or disc storage devices, which have a so-called clock track recorded on them. The present invention also relates to apparatus for use in the production of such magnetic storage devices.

The provision of one or more clock tracks on a magnetic storage device of the kind in which signal elements, for example, binary signal elements or "bit," are recorded at corresponding uniformly spaced positions along the lengths of a plurality of signal tracks, is well known. The clock tracks are such that, in operation of the device, apparatus associated with reading heads which are aligned with the clock tracks, can produce timing signals for use firstly in recording signal elements at the required positions on the signal tracks and secondly, when reading signals from the device, in indicating all the instants of time at which signal elements may be read from the signal tracks. Commonly, on a drum or disc storage device, two clock tracks are provided, one for producing a timing signal for every signal element position along the signal tracks and the other for producing a timing signal once per cycle of operation of the device. In some cases a third track is also provided for producing a timing signal marking the beginning of each of a plurality of groups of signal elements, i.e., "word position signals."

Broadly speaking two methods have so far been used for the production of a clock track for use in the production of timing signals corresponding one to each signal element position on the signal tracks. In one case, suitable signals have been recorded on the device under the control of an oscillator of suitable frequency. In the other physical marks are made on the device or a storage surface of the storage device, for example, by use of a dividing head or by a photo-etching technique. These marks may be made in the magnetic part of the surface or on a non-magnetic part of the surface alongside the magnetic part, for example, on a non-magnetic rim. In the latter case the marks are subsequently filled with magnetic material to enable the desired signals to be derived by means of a magnetic reading head and associated apparatus.

Clock tracks produced by both these methods, although enabling the required number of timing signals e.g. clock pulses, to be produced, suffer from the disadvantage that small variations in the clock track are apparently unavoidable, with the result that the timing signals derived from it in operation may have spurious amplitude and/or frequency modulation. These spurious effects are more pronounced, the higher the repetition frequency of the timing signals, this will be higher, the closer the signal element position spacing along a track and/or the higher speed of scanning of the tracks, and may lead to unacceptable inaccuracies where the repetition frequency is of the order of 250 kc./s. or more.

It is an object of the present invention to provide a method of producing magnetic storage devices which have a clock track recorded on them, the timing signals derived from which in operation are relatively free from spurious modulation.

According to the present invention a method of producing a magnetic storage device which has a clock track recorded on it, comprises a first step of recording a primary clock track on the storage device and a second step of recording a secondary clock track on the storage device, the signals recorded to form the secondary clock track being produced by reading the primary clock track and submitting the signals derived by so doing to amplitude limitation and frequency filtering such as to reduce any spurious amplitude and/or frequency modulation of these signals.

The second step may be repeated as many times as may be considered desirable, the signals recorded at each repetition being produced by reading the secondary clock track already recorded and submitting the signals derived by so doing to amplitude limitation and frequency filtering such as to reduce any spurious amplitude and/or frequency modulation of those signals.

In the case of a rotary magnetic storage device such as a magnetic drum or disc storage device, the primary clock track may be recorded on it by recording signals derived from a signal generator which is mechanically synchronised to the rotation of the storage device. The signal generator may comprise a disc mounted for rotation on the same shaft as the storage device and carrying a series of sensible indicia which are equal in number to the desired number of timing signals to be produced for one rotation of the storage device and spaced at substantially uniform intervals around a circular track on the disc, and sensing means adapted and arranged to derive electrical signals from the passage of said indicia past it during rotation of the disc. The indicia may for example be discontinuities in the magnetic or electric properties of the disc or a surface layer thereof, these being sensed by suitable magnetic or electric sensing means, or discontinuities in the light transmitting or reflecting properties of the disc or a surface thereof, these being sensed by a photo-electric sensing means arranged to operate in combination with a suitable light source.

Each secondary clock track may be recorded on a different track from that on which the primary clock track or the preceding secondary clock track is recorded, or if the method of recording is such that anything previously recorded on the part of the storage device on which recording is taking place, is automatically erased, the secondary clock tracks may be recorded over the primary clock track or the preceding secondary track, as the case may be.

The present invention also provides apparatus for use in the production of a magnetic storage device having a clock track recorded on it, the apparatus comprising means for recording a primary clock track on the storage device, means for reading signals from a track on the storage device, means for recording signals on the same or another track on the storage device and signal translating means for coupling the reading and recording means and including means for reducing amplitude and/or frequency modulation of signals fed to it.

The means for recording a primary clock track may, in the case of a rotary storage device, comprise a signal generator which is mechanically synchronised to the rotation of the storage device and means for recording signals produced by said generator on a selected track on the storage device.

Examples of methods according to the present invention of producing a magnetic storage device which has a clock track recorded on it, and apparatus for use in the production of such magnetic storage devices will now be described by way of example, with reference to the accompanying drawing in which.

In all methods according to the invention, the recording of a clock track is carried out in at least two stages. In the first, what is referred to in this specification as a primary clock track is recorded on the storage device, the signals recorded being derived from some source external to the storage device. In the second, a secondary clock track is recorded on the storage device, the signals recorded being produced by reading the primary clock track and submitting the signals derived by so doing to amplitude limitation and frequency filtering.

In the particular case to be described with reference to the drawings, the storage device is a magnetic drum and the signals recorded to form the primary clock track are derived from a signal generator which is mechanically synchronised to the rotation of the drum.

Figure 1:
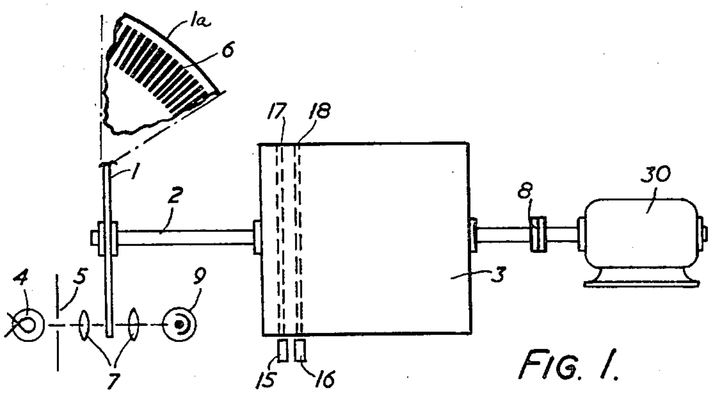
FIGURE 1 is a schematic diagram of parts of the apparatus

Referring now to FIGURE 1 of the drawings, there is shown a master clock disc 1 forming part of the signal generator which disc 1 is mounted on the same shaft 2 as a magnetic storage drum 3. One end of the shaft 2 is coupled by a releasable coupling 8 to the output shaft of a motor 30. The disc 1 is of glass.

A part 1*a* of the disc 1 is shown in FIGURE 1 as it appears when viewed axially and it will be seen from it that the disc 1 carries on one face a circular array of alternately opaque and transparent lines 6 which can be produced for example by the well known technique of photo-etching. The number of transparent lines 6 is made equal to the number of timing signals required per revolution of the drum 3 from a clock track which is required to provide a timing signal for each signal element position on the signal tracks. Light from a diffused illumination source 4 passes through a slotted screen 5, an optical system 7 and a part of the disc 1 where it carries the lines 6, to a photo-electric cell 9, the arrangement being such that, when the disc 1 rotates in operation, the cell 9 is alternately substantially fully illuminated by the source 4 and then not illuminated. If the lines 6 are very fine, some difficulty may be experienced in setting up the optical system and it has been found, preferable in such a case to interpose in the light path a screen carrying a strip which is the negative of a photograph of a part of the array. If the strip is aligned so that lines on it are at a slight angle to those on the disc which are illuminated, so-called "Moire fringes" are formed which traverse the cell 9 in synchronism with the passage of the lines 6 and give rise to the required alteration of illumination and non-illumination of the cell 9.

Taking a particular case in which the drum 3 is required to rotate in operation at 6,000 r.p.m. and to have a clock track from which a clock pulse train having a repetition frequency of 250 kc./s. can be produced, the clock track must have 2,500 recorded pulsed on it and the number of lines 6 in the array on the disc 1 will therefore also be 2,500.

It will be appreciated that the disc and sensing arrangement may take other forms than that described above. For example, an opaque slotted or toothed disc may be sensed photoelectrically. Alternatively, magnetic segments on a non-magnetic disc may be sensed by a magnetic sensing head, or conducting segments on a non-conducting disc may be sensed by an adjacent probe sensitive to changes in capacity.

During recording of the primary clock track, the shaft 2 is rotated at a reduced speed of approximately 100 r.p.m. The shaft 2 may for example be rotated by hand after dis-connecting the coupling 8, or the coupling 8 may be replaced by a reduction gear so that the shaft 2 may be driven at the reduced speed by the motor 30. This speed of rotation was chosen because it produced an output signal having a repetition frequency of about 25 kc./s., which was within the optimum operating region of the particular type of photo-electric cell which was employed.

The drum 3 is shown in FIGURE 1 as having two tracks 17 and 18 with which are associated magnetic transducing heads 15 and 16 respectively, but it will be appreciated that many more may be provided, switching means being provided to connect them as required to signal input or output paths in known manner.

Figure 2:
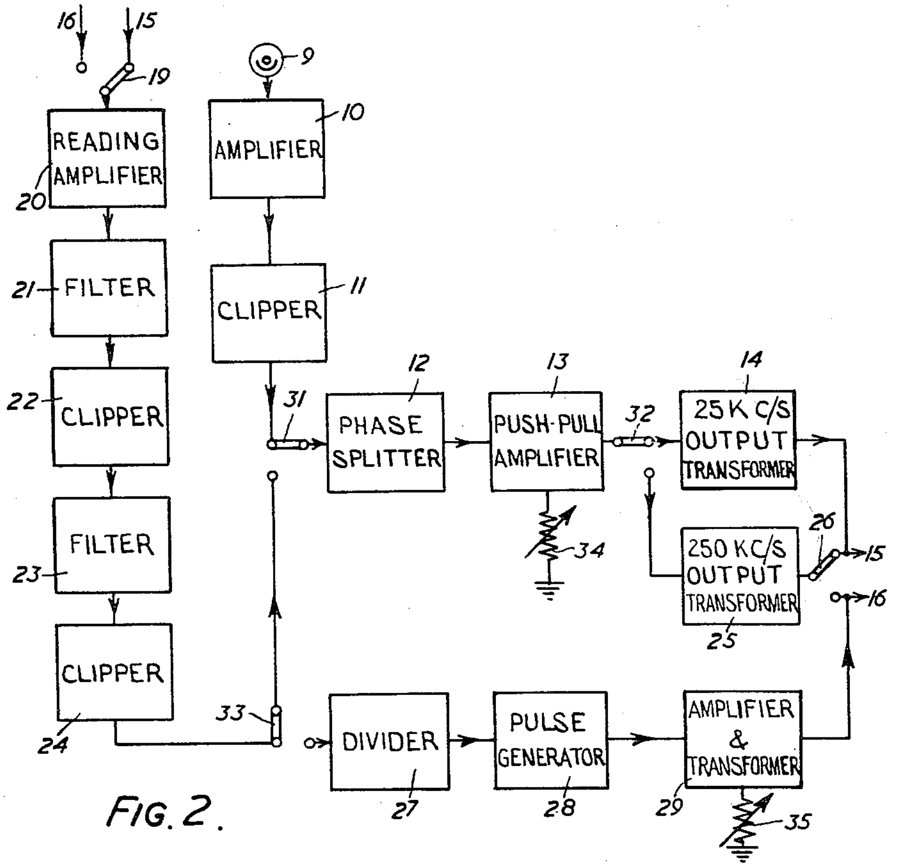
FIGURE 2 is a block diagram of circuits forming part of the apparatus.

Turning now to FIGURE 2 which shows a block circuit diagram of one form of the electronic apparatus which may be used with the apparatus of FIGURE 1 in carrying out methods according to the invention, the photoelectric cell 9 is shown coupled to an amplifier 10, the output of which is fed through an amplitude clipper circuit 11 to a switch 31. With the switch 31 in the position shown in FIGURE 2, the output of the clipper circuit 11 is passed through a phase splitter 12 and a push-pull amplifier 13 to a switch 32. With the switch 32 in the position shown in FIGURE 2, the output of the push-pull amplifier is applied to an output transformer 14, designed for operation at 25 kc./s., and thence to the transducing head 15 of FIGURE 1 associated with the track 17 of the drum 3.

Thus with the disc 1 and drum 3 rotated as described at about 100 r.p.m., the pulse signals developed by the cell 9 as a result of the passage of the lines 6 on rotation of the master clock disc 1 are recorded by the head 15 on the track 17 of the drum 3 to form a primary clock track. Any variation in the amplitude of the pulses generated by the photo-cell 9 is reduced by the clipper circuit 11. The phase splitter 12, the push-pull amplifier 13 and the transformer 14 are of conventional design such that, under normal operating conditions, the track 17 is magnetically saturated in one direction in the absence of a pulse and in the other direction when a pulse occurs. Thus, any signal already recorded in the track 17 is automatically erased by over-writing by a new signal. The amplifier 10 and the clipper circuit 11 are also of conventional design.

It has been found, however, that an abrupt change in the amplitude of the recording current passed through a head recording on a storage device such as the drum 3 tends to produce an unwanted phase shift in the recorded signal. To avoid such shifts, the amplifier 13 is initially cut off by suitable adjustment of a variable bias control resistor 34. With the disc 1 and the drum 3 rotating all the time, the resistor 34 is slowly adjusted to reduce the bias until the amplifier 13 is operating normally so that recording can take place, and is then slowly returned to the cut off position. The adjustment of the resistor 34 may be effected manually, or it may be controlled by a cam (not shown) driven through reduction gearing (not shown) from the shaft 2.

For the second and further stages of the method for which the disc 1 is preferably removed from the shaft 2, the switch 19 can be set to couple either of the heads 15 or 16 to the input of a reading amplifier 20. The output of the amplifier is coupled to the input of a cascade of filter and clipper circuits 21, 22, 23 and 24, of which the filter circuits 21 and 23 are designed to reduce any frequency variation in a signal nominally of 250 kc./s. frequency and the clipper circuits 22 and 24 to limit the amplitude of such a signal so as to reduce any spurious amplitude modulation. The output of the second clipper circuit 24 is connected through a switch 33, when in the position shown in FIGURE 2, and switch 31 which is changed over from the position shown in FIGURE 2, to the input of the phase splitter 12. For the second stage, the switches 32 and 36 are also changed over so that the output of the amplifier 32 is fed through a transformer 25 designed for operation at a frequency of 250 kc./s., to the head 16 associated with the track 18 of the drum 3.

Thus with the switch 19 in the position shown in FIGURE 2 and the drum 3 rotating at its operational speed of 6000 r.p.m., the primary clock track is read to produce a clock pulse train which is submitted to filtering and limitation in the filter and clipper circuits 21–24 before being recorded on the track 18 of the drum 3, as a secondary clock track. In doing this, the current supplied by the recording amplifier 13 is slowly varied from zero to a maximum and back to zero during the recording of the secondary clock track, in the same way and for the same reason as it is during the recording of the primary clock track.

It was found to be satisfactory to use parallel resonant circuits as the frequency selective elements in the filter circuits 21 and 23. However, other frequency selective elements, such as bridged-T circuits, may equally well be used. Conventional diode amplitude limiting circuits or limiting amplifiers may be used for the clipper circuits 11, 22 and 24.

After completing the recording of a secondary clock track in the track 18, the switches 19 and 26 may be changed over and the second stage repeated. The head 16 then reads the secondary clock track and produces signals which are fed through a chain of circuits 21–24 already described to drive the amplifier 13 to energise the head 15 to record a further secondary clock track in track 17 of the drum 3. This further secondary track will be improved as compared with the first one by the action of the filter and clipper circuits 21–24. It will be appreciated that the second stage may be repeated several times in this way, the secondary clock track recorded during one stage being read to provide the input signals to the amplifier 20 during the next stage. In one particular case, it was found that four recordings of a secondary clock track were sufficient to reduce the frequency deviations of the clock pulse train derived from the final one to less than 0.4% of that of the train derived from the primary clock track which was a sufficient degree of uniformity for the apparatus in which the storage drum 3 was to be used. The number of repetitions of the second stage required to produce a given standard of uniformity depends upon the accuracy of the primary track recorded from the disc 1 and the efficiency of the filter and clipper circuits 21–24.

If the switch 33 is set to the position other than that shown in FIGURE 2, the output of the clipper circuit 24 is fed to a frequency divider 27 which operates to produce an output signal once for every *n*th one (where *n* is an integer that can be determined according to requirements) of the signals applied to it. The output of the divider 27 is fed to a pulse generator 28 to produce for each output signal from the divider 27 an output pulse of the required form which is fed to an amplifier and transformer circuit 29, the amplifier of which is similar to the amplifier 13 and has a bias control resistor 35, and the transformer of which is designed for operation at the frequency of the output from the divider 27. The output from the amplifier and transformer circuit 29 is fed to the head 16 for recording in the track 18 of the drum 3.

This part of the circuit may be employed to produce a clock track for use in producing a timing signal for each of a number of equal groups of signal element positions on one of the signal tracks, for example a timing signal for each word recorded on one of the information tracks of a storage drum of a digital computer. Such a clock track may be recorded on the track 18 of the drum 3 from a secondary clock track on the track 17, the switching being set as in FIGURE 2 and the switch 33 changed over. Then with the drum 3 running at its normal speed, the secondary clock track is read and the signals so produced are passed after the usual filtering and amplitude limitation to the frequency divider 27. This may be such for example as to produce an output signal for every sixteenth or thirty second one of the signals fed to it, so that a clock track is recorded on the track 18 which has a signal for every group of sixteen or thirty two signal element positions on the track. During this operation the bias control resistor 35 is operated in the manner described for the resistor 34.

The frequency divider may consist of a known multivibrator or blocking oscillator circuit which operates at the required output frequency and is synchronised by the clock pulses, or a chain of binary counting stages. The frequency division ratio is determined according to the particular requirements of a given case. The pulse generator 28 may be a mono-stable trigger circuit for example.

It is also possible to substitute a frequency multiplier for the frequency divider 27 so as to record a clock track for producing timing signals having an even higher repetition frequency than those produced by the signals derived from a secondary clock track recorded on the drum 3. It is also possible to employ a frequency multiplier when recording a secondary clock track from signals produced by reading the primary clock track or in recording the primary clock track from the signals produced by sensing the disc 1.

In addition, a clock track providing one output pulse per rotation of the drum 3 may also be recorded on a separate track on the drum 3. This clock track may be recorded by running the drum 3 with an erasing head for the track concerned energised until there is nothing recorded on the track. The drum 3 is then stopped with the desired pulse recording position beneath a recording head which is then energised by passing a direct current through it such as to produce magnetic saturation of the drum surface. If this revolution marker clock track is recorded first, the pulses produced by reading it, may be utilised to synchronise an oscilloscope for monitoring the signals produced from the other clock tracks which are subsequently recorded.

Whilst the recording of the primary clock track is carried out in the method described above by recording signals produced by sensing the markings on the disc 1, or by sensing other forms of discontinuities on a similar disc, it will be appreciated that any other form of signal generator of suitable frequency and suitably synchronised to the rotation of the drum 3 may be provided. Similarly whilst certain block circuits have been described with reference to FIGURE 2, their function may equally be carried out by other circuit arrangements suited to particular circumstances. Basically all that is required is the filtering and amplitude limiting of the signals derived from the primary clock track or a secondary clock track before using them to record a or another secondary clock track.

The particular method described was for recording a clock track on a magnetic storage drum and it will be appreciated that it may be readily adapted for use in recording clock tracks on other forms of rotary (or otherwise cyclically operating) magnetic storage devices, for example magnetic disc storage devices. The same basic method may also be used for recording clock tracks on magnetic tapes or bands, a primary clock track being recorded first from some external source, and signals produced from the primary track being recorded, after filtering and limiting, to produce a secondary clock track.

Figure 3B:
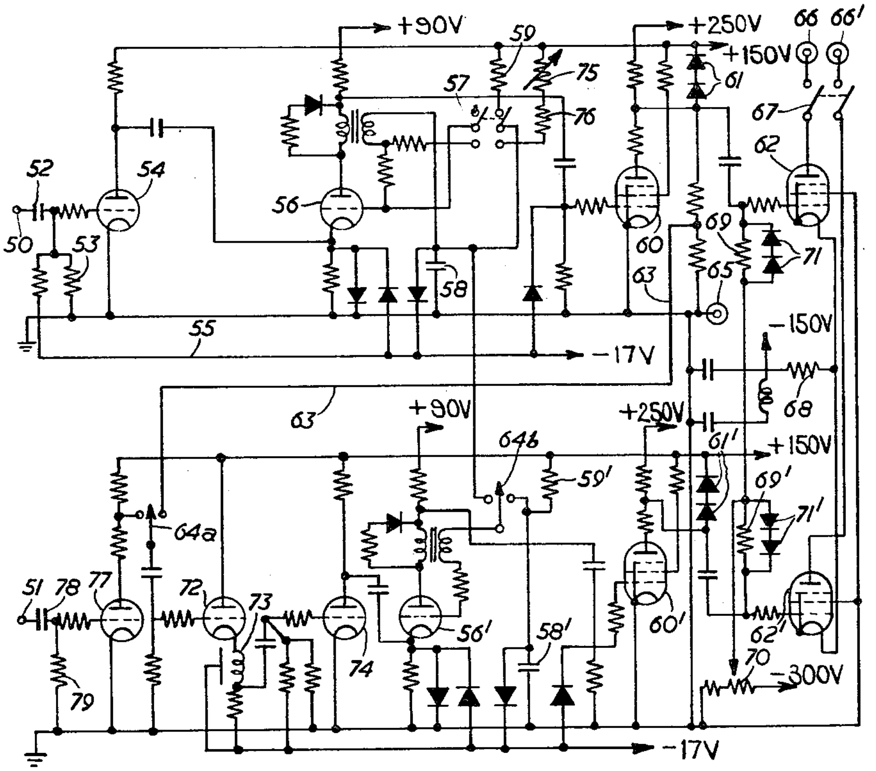
FIGURES 3A and 3B show detailed circuit diagrams of parts of one form of the block circuit of FIGURE 2.
Figure 3A:
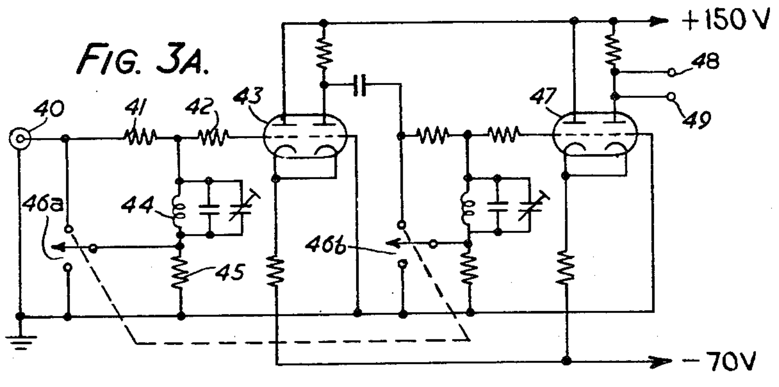

As mentioned above, practical realisations of the block circuit shown in FIGURE 2 may take many forms. FIGURES 3A and 3B show detailed circuit diagrams of parts of one such that was developed for use in the particular case already mentioned in which the drum rotates at 6000 r.p.m. and is required to have a clock track from which a clock pulse train having a repetition rate of 250 kc./s. can be produced. In addition, in this case, the drum 3 is intended for use in a digital computer in which signals are recorded on the signal (or information) tracks are in binary form, a binary one being recorded as a positive pulse followed by a negative pulse and a binary zero as a negative pulse followed by a positive pulse. The pulse separation in either case is two microseconds. In known manner, the heads used with this drum for recording in this way, are head having an earthed center tap on their windings. The two halves of the head winding are connected in the anode circuits of like valves so that a current flows in either half when the corresponding valve conducts, the currents in the two halves giving rise to opposite magnetisation of the drum surface. To record a binary signal element the two valves are rendered conducting in turn at the required time interval and in the order required by the nature of the element to be recorded.

To record a clock track to provide a clock pulse for every signal element position, a series of binary ones is recorded at every signal element position on the track selected for this purpose.

It will be appreciated that this method of recording using centre tapped heads necessitates appropriate variation of what may be termed the recording circuits of FIGURE 2, i.e. the phase splitter 12, the push pull amplifier 13 and the output transformers 14 and 29. The same applies to the amplifier and transformer circuit 29 used when recording a word maker clock track for example. The output transformers are in fact not required and the phase splitter and push-pull amplifier have to be replaced by other circuits which are described below.

FIGUTE 3A shows a combined filter and clipper circuit which incorporates switches to enable it to be used either as the clipper circuit 11 alone, when recording the primary clock track, or as the filter and clipper circuits 21–24, when recording a secondary clock track.

Referring now to FIGURE 3A, the coaxial input socket 40 of the circuit may be coupled to the output of either a pre-amplifier (not shown) associated with the photoelectric cell 9 or a reading pre-amplifier (not shown) which can be coupled to receive the output from either of the heads 15 and 16, the selection being made according to the particular stage of the clock track recording method that has been reached. The pre-amplifiers are of conventional form. The centre connection of socket 40 is connected through resistors 41 and 42 to the control grid of a double triode valve 43 connected as a conventional limiting and squaring amplifier. Between the common terminals of the resistors 41 and 42 and earth, are connected in series a parallel resonant circuit 44, the resonant frequency of which is 250 kc./s., and a resistor 45. The resistances 41 and 45 are both large compared with the impedance of the circuit 44 other than at or near its resonant frequency. A switch **46*a* is provided which, when "down," ("down" and "up" are used here with reference to the positions shown in the drawing) short circuits the resistors 45 leaving the circuit 44 connected across the grid circuit of the first half of the valve 43 and earth. In this condition, the circuits act as a filter effectively passing only signals the frequency of which is 250 kc./s. With the switch 46*a* "up," the circuit of the valve 43 acts as a squaring and limiting amplifier to the signals of frequency 25 kc./s. which are applied to it. The circuit of the valve 47 is identical and is fed from the anode circuit of the second half of the valve 43. The switch 46*b* is ganged to switch 46*a* and the two are operated to be "up" during the second and further stages of a recording, so that the filtering action is obtained, and to be "down" during the first stage. In either case amplitude limiting and squaring takes place such as to reduce any amplitude variation in the signals passed through the circuit. Two output terminals 48 and 49 are connected to the anode of the second half of the valve 47. The remaining parts of the circuit are identical and will not be described. The output appearing in operation at the terminals 48 and 49** is a substantially square wave having a frequency nominally of 250 kc./s. or 25 kc./s. depending on the stage of the method that has been reached.

FIGURE 3B shows a circuit diagram of pulse generating and amplifying circuits which can be used with the circuits of FIGURE 3A, to operate earthed centre tap type recording heads. The pulse generating circuits are arranged so that they can be switched to operate as a frequency divider, thus eliminating the need for the separate chain of circuits 27–29 of FIGURE 2.

Referring now to FIGURE 3B, the circuit shown has two input terminals 50 and 51 which are connected to the output terminals 48 and 49 of FIGURE 3A respectively. In operation, therefore, the input to the circuits of FIGURE 3B will be substantially square waves. Considering the input terminal 50 first, this input is differentiated by a differentiating circuit consisting of a capacity 52 and a resistor 53, the result being applied to the control grid of a triode thermionic valve 54. As a negative bias is applied from the −17 volt supply line 55, only the positive pulse of the differentiated waveform is effective, producing a negative pulse at the anode of the valve 54. This is applied to the cathode of a triode valve 56 which is connected as a blocking oscillator. With the switch 57 in the "up" position, the blocking oscillator operates to produce one output pulse for each pulse applied to it, the length of its recovery time being determined largely by the magnitudes of the capacitor 58 and the resistor 59. Negative-going output pulses are therefore applied to the control grid of a pentode valve 60 which is connected conventionally as an amplifier. Positive going output pulses, squared and limited in amplitude by the diodes 61, are applied from the anode circuit of the valve 60 to the control grid of a pentode valve 62, one of a pair, the operation of which is described below. A second output, of smaller amplitude is applied over the line 63 to one pole of a switch **64*a*** in a part of the circuit not yet described.

The valve 62, with a similar valve 62¹, are output amplifiers for passing the appropriate currents through the half windings of a centre-tapped recording head, to record a binary element. As will be described, the valve 62¹, during the recording of a secondary clock track, receives for this purpose a positive pulse at its control grid two microseconds after each pulse applied to the control grid of the valve 62. The two end terminals of the head winding (not shown) are connected by screened cables to the coaxial output sockets 66 and 66¹, the centre connections of which are connected through a double pole switch 67, when closed, to the anodes of the valves 62 and 62¹. These are in fact conventional amplifiers with their anodes earthy and their cathodes connected through a common load resistor 68 to a 150 volt negative supply line. The control grids of the two valves 62 and 62¹, to which input pulses are applied, are connected through resistors 69 and 69¹ to the variable tapping of a potentiometer 70 forming part of a resistance chain connected between earth and a negative 300 volt supply line. Diodes 71 and 71¹ are connected across the resistors 69 and 69¹ respectively. The control grids of the valves 62 and 62¹ are thus, in the absence of a signal pulse, maintained at a potential determined by the setting of the potentiometer 70. This is manipulated during recording of a clock track in the manner described previously with reference to FIGURE 2 concerning the bias controls 34 and 35, so that the valves 62 and 62¹ are at first cut right off, even during the application of a pulse to their control grids, are subsequently brought gradually to the point where they are biased so that each pulse applied to the control grid of either valve 62 or 62¹ causes the required current pulse to flow in the corresponding half of the head winding, and are then gradually cut off again after recording had finished. The centre tap of the head winding is connected by a screened cable to the earthed coaxial socket 65.

To provide the delayed pulses required for application to the control grid of the valve 62¹ two microseconds after each pulse applied to the valve 62 the switch 64 which is to the right (as shown in FIGURE 3B) during recording of a secondary clock track, applies the positive pulses received from the anode circuit of the valve 60 to the control grid circuit of a triode valve 72 which is connected as a cathode follower. The cathode load of this includes a two microsecond delay line 73, the output of which is applied to the control grid of a triode amplifier valve 74. An output of negative pulses from the anode of the valve 74 is applied to the cathode of a triode valve 56¹ which is connected as a blocking oscillator similarly to the valve 56, the switch 64*b* being to the right in the case of recording a secondary clock track. The circuit constants of the oscillator formed by the circuit of valve 56¹ with switch 64*b* to the right are identical with those of the circuit of valve 56 when the switch 57 is "up," as it is during recording of a secondary clock track. As in the case of the valve 56, a negative going pulse output is taken from the anode circuit of the valve 56¹, inverted in the amplifier formed by the circuit of the valve 60¹, and applied as a positive going pulse to the control grid of the valve 62¹. These pulses will be, as required, delayed by two micro-seconds on the corresponding pulses applied to the control grid of the valve 62 owing to the delay introduced by the delay line 73.

If frequency division is required, for recording of a work marker clock track, the switch 57 in the circuit of the valve 56 is changed to its "down" position where the high resistance chain formed by a variable resistor 75 and a fixed resistor 76, alter the time constants of its recovery, such that it responds only to every *n*th one of the pulses applied to it, *n* being an integer which can be varied by adjustment of the resistor 75. In this case, the circuit for the generation of pulses for application to the valve 62¹ formed by the circuits of valves 72, 74, 56¹ and 60¹, will also receive a pulse only for every *n*th one of the pulses applied to the valve 56, as it is fed, the switch 64*a* still being to the right, from the anode circuit of the valve 60.

When recording a primary clock track, a different longer time spacing of the pairs of pulses applied to the valves 62 and 62¹ is required, if the recorded pulses are to give the required output when the drum 3 is run at 6000 r.p.m. during recording of a secondary clock track from the primary one. It will be remembered that the output from the circuit of FIGURE 3A is a square wave, the positive going crossovers of which are effective to trigger the valve 56. The negative going crossovers of the 25 kc./s. square wave derived from the master clock disc 1 are at the correct time spacing from the positive ones, and it is from these that the pulses applied to the valve 62¹ during recording of a primary clock track are derived. To this end, the switch 65*a* is changed over to the left, disconnecting the grid circuit of valve 72 from the line 63 and connecting it instead to the anode circuit of an amplifier triode valve 77. The circuit of this is arranged so that it is normally "bottomed" and its control grid circuit includes a differentiating circuit formed by a capacitor 78 and a resistor 79. The input terminal 51 is connected to the output terminal 49 of the circuit of FIGURE 3A and thus receives the square wave output from that circuit. Owing to the "bottomed" condition of the valve 77, only the negative going pulses formed on differentiation are passed by the valve 77 as positive going pulses to the control grid circuit of the cathode follower valve 72. These pulses correspond to the negative going crossovers of the square wave and are effective to trigger the blocking oscillator valve 56¹ in the same way as the pulses received from the valve 60 during recording of a secondary clock track. The two microsecond delay introduced by the delay line 73 is small enough to be negligible in this case and pulses with the required timing are thus applied to the control grid of the valve 62¹.

In recording a primary clock track, the switch 64*b* is in its left hand position thus disconnecting the capacitor 58¹ and the resistor 59¹ and connecting both blocking oscillator circuits to use the same capacitor 58 and resistor 59. This is done to prevent spurious triggering of either after firing of the other which has been found to occur due to pick-up between the cables connecting the circuit of FIGURE 3B to the head winding to which it is connected.

The circuits described with reference to FIGURES 3A and 3B were designed for use in a particular case and it will be appreciated that they are in no way essential to carrying out methods according to the present invention.

I claim:

1. Apparatus for recording synchronising signals on a track of a magnetic storage device operating cyclically at a constant rate comprising reading means operative during one cycle of the storage device in response to each of a series of signals recorded at approximately equal spacing in said track to produce an electrical signal, said electrical signals being produced approximately at a constant frequency; means for temporarily storing each of said electrical signals for a predetermined duration and having an input circuit connected to the reading means and having an output circuit; said temporary storage means including a filter network operative to attenuate, relative to signals of said constant frequency, all other signals to cause signals in said output circuit to be more nearly equally spaced than the electrical signals; and recording means operative in response to the signals in the output circuit to record the like number of synchronising signals in said track.

2. Apparatus for recording synchronising signals in a track of a magnetic storage device operating cyclically at constant rate comprising means for recording a train of nearly equally spaced first signals in a first track of the storage device; means responsive, during one cycle of the storage device, to said recorded train of first signals to generate a like train of electrical signals having substantially a constant frequency; signal amplitude limiting means; a filter network operative to attenuate, relative to signals of said constant frequency, all other signals; means operative to feed said train of electrical signals through said amplitude limiting means and said filter network in succession to produce a train of synchronising signals; and means for recording said train of synchronising signals in a second track of the storage device.

3. Apparatus for recording a predetermined number of synchronising signals on a track of rotor magnetic storage device comprising a disc mounted for rotation in synchronism with the storage device; a series of sensible indicia equal in number to said predetermined number of synchronising signals and spaced at substantially uniform intervals around a circular track of the disc; sensing means responsive to the passage of said indicia past the sensing means during a revolution of the storage device to produce a train of first signals equal in number to said predetermined number; a first track of said storage device; first recording means responsive to said first signals to record said first signals at substantially equal spacing in said first track; driving means operable to rotate the storage device at a constant invariable speed; reading means operative, during rotation of the storage device at said constant speed, in response to said recorded first signals to generate a train of second signals at a substantially constant frequency and equal in number to said predetermined number; a second track on said storage device; second rcording means operatively coupled to said second track; circuit means including a filter network operative to attenuate, relative to signals of said constant frequency, all other signals; and having an input circuit connected to said reading means and an output circuit connected to said second recording means.

4. Apparatus for recording uniformly spaced synchronising signals on a track of magnetic storage device operating cyclically at constant rate comprising first and second tracks on the storage device; means for recording a train of substantially uniformly spaced signals in said first track; first signal transducing means operatively coupled to said first track and responsive to said train of signals during a first cycle of the storage device to generate a like train of electrical signals substantially at a constant frequency; circuit means having an input terminal and an output terminal and including a filter network connected between said input and output terminals and operative to attenuate, relative to signals of said constant frequncy, all other signals; second signal transducing means operatively coupled to said second track; and switching means operative during said first cycle to connect the first transducing means to the input terminal and the second transducing means to the output terminal and operative in a further cycle to connect the second transducing means to the input terminal and the first transducing means to the output terminal; said first transducing means being operative during said further cycle to record in said first track signals from said output terminal.

References Cited in the file of this patent

UNITED STATES PATENTS

| | | |
|---|---|---|
| 2,652,554 | Williams et al. | Sept. 15, 1953 |
| 2,702,380 | Brustman | Feb. 15, 1955 |
| 2,801,407 | Lubkin | July 30, 1957 |